United States Patent
Lakshmi Narayanan et al.

(10) Patent No.: US 7,443,835 B2
(45) Date of Patent: Oct. 28, 2008

(54) POLICY BASED MECHANISMS FOR SELECTING ACCESS ROUTERS AND MOBILE CONTEXT

(75) Inventors: Ram Gopal Lakshmi Narayanan, Woburn, MA (US); Man Li, Bedford, MA (US)

(73) Assignee: Nokia Corporation, Espoo (FI)

( * ) Notice: Subject to any disclaimer, the term of this patent is extended or adjusted under 35 U.S.C. 154(b) by 1054 days.

(21) Appl. No.: 10/309,366

(22) Filed: Dec. 2, 2002

(65) Prior Publication Data

US 2003/0103496 A1 Jun. 5, 2003

Related U.S. Application Data

(60) Provisional application No. 60/336,937, filed on Dec. 3, 2001.

(51) Int. Cl.
*H04L 12/66* (2006.01)
(52) U.S. Cl. ........................... 370/352; 370/331
(58) Field of Classification Search .............. 370/352, 370/331; 455/436, 440, 439, 442
See application file for complete search history.

(56) References Cited

U.S. PATENT DOCUMENTS

| 5,442,633 | A | 8/1995 | Perkins et al. |
|---|---|---|---|
| 6,091,953 | A | 7/2000 | Ho et al. |
| 6,151,319 | A | 11/2000 | Dommety et al. |
| 6,272,129 | B1 | 8/2001 | Dynarski et al. |
| 6,501,741 | B1 | 12/2002 | Mikkonen et al. |
| 2005/0105491 | A1* | 5/2005 | Chaskar et al. ............. 370/331 |

FOREIGN PATENT DOCUMENTS

| EP | 1111872 | 6/2001 |
|---|---|---|
| WO | 0124476 | 4/2001 |
| WO | 0184341 | 11/2001 |
| WO | 0191389 | 11/2001 |

OTHER PUBLICATIONS

Rajeev Koodli, et al., "A Context Transfer Framework for Seamless Mobility", Communication Systems Laboratory Nokia Research Center, XP015031160, Nov. 20, 2001, pp. 1-29.

* cited by examiner

*Primary Examiner*—Stella L Woo
(74) *Attorney, Agent, or Firm*—Squire, Sanders & Dempsey L.L.P.

(57) ABSTRACT

In mobile IP networks, when a mobile node (MN) moves from one cell to another, handover occurs. The result of the handover is that the MN connects to the network through a new access router (AR). The handover may occur between access routers of the same or different administrative domains. In all cases, the information related to the mobile node has to be transferred from the old AR to the new AR in order to minimize the effect of the change of access routers.

13 Claims, 3 Drawing Sheets

POLICY BASED MECHANISMS FOR SELECTING ACCESS ROUTERS AND MOBILE CONTEXT

The present invention claims the priority of provisional patent application No. 60/336,937, filed on Dec. 3, 2001, the contents which are incorporated herein.

BACKGROUND

In mobile IP networks, when a mobile node (MN) moves from one cell to another, handover occurs. The result of the handover is that the MN connects to the network through a new access router (AR). The handover may occur between access routers of the same or different administrative domains. In all cases, the information related to the mobile node has to be transferred from the old AR to the new AR in order to minimize the effect of the change of access routers. This is the so-called context transfer (see H. Syed et al, "General Requirements for a Context Transfer Framework," draft-ietf-seamoby-ct-reqs-alpha05.txt, IETF Internet Draft, May 2001). We propose a policy-based approach that is efficient, secure and does not require significant additional functionalities being built into access routers.

Current or proposed solutions are based on moving the complete intelligence to the network elements, i.e., access routers. Each access router must discover candidate access routers for possible handover, select the target access router for actual handover based on the capabilities of the mobile node, authenticate the target access router and finally perform the context transfer. Specifically, each access router performs the following functions:

1. Contacting the respective Home agent server
2. Contacting the Home AAA server
3. Interpreting the static subscription profile of the mobile node
4. Authenticating and authorizing the neighboring access routers
5. Interpreting the static capability of the neighboring access routers (and/or)
6. Moving the static capacity of the mobile node to the access routers (and/or)
7. Performing some pre-context activities before the actual context transfer
8. Finally transferring the context to the new access router These functions are in addition to the main responsibilities of an access router, i.e., to route IP packets based on subscriber information and to perform metering and monitoring for charging and management purposes. Hence, the above functions may require a radical change in the current Internet infrastructure. The following are the potential shortcomings:

1. Currently there is no common mechanism for two access routers to exchange information across two autonomous systems (AS).
2. For security reasons, network operators do not want to expose the capabilities or capacity of their access routers. If one of the router is compromised the whole system is likely to get compromised. Yet current solutions require routers to expose their capabilities to other routers in same or different domains
3. Moving the intelligence to the access router is a security issue. Control and update distributed information is always a potential problem. In strictly protected networks such as Telecom networks, this may be less important. But IP networks are not as easy to protect as Telecom networks.
4. There are no automatic schemes where routers can authenticate each other. They may relay on public key based mechanism but it's a along way to go as the public key mechanism may take time into effect.
5. The router selection rules or algorithms are installed on all access routers or Mobile Nodes. This may increase the cost of both access routers and mobile nodes and impact router performance. In addition, a simple change of the selection rules requires updating on all routers or mobile nodes.

The above-mentioned references are exemplary only and are not meant to be limiting in respect to the resources and/or technologies available to those skilled in the art.

SUMMARY

The proposals in this invention comprise two aspects. First, we propose a policy based mechanism to select a possible target (new) access router for context transfer. Second, we describe two context transfer sequences for intra/inter domain handovers.

BRIEF DESCRIPTION OF THE DRAWINGS

The disclosed inventions will be described with reference to the accompanying drawings, which show important sample embodiments of the invention, wherein.

DETAILED DESCRIPTION

An embodiment of the invention may perform policy based target router selection and context transfer. Embodiments may provide the following benefits:

1. Balance the functionalities between policy servers and access routers.
2. Centralize the critical information for admission control and operation of the network in the policy server. This makes updating and protecting the policy rules easier.
3. Routers do not need to expose and discover the capabilities of other routers because this information is readily available at policy servers. This effectively reduces the amount of messages exchanged over the network, saving valuable bandwidth.
4. Access routers are freed from target router selection process and most of context transfer process. Hence they can focus on performing their main duty, i.e., route internet protocol packets.
5. Access routers need not execute proxy application if their neighbors are running different technology.
6. In most wireless networks, the critical resource is radio spectrum. In the traditional mechanism where handover occurs prior to authorization, radio resources are allocated to the MN prior to authorization. If the MN failed the authentication and authorization process, then such radio resources have to be revoked. This could have repercussions such as the blocking of a legitimate user that could be handed over to this network otherwise. By performing an authorization prior to handover, we avoid this problem of blind radio resource allocation, thereby conserving use of the radio spectrum and associated radio resources.
7. Receiver driven approach for target selection helps in reducing denial of service attacks.

A possible disadvantage is that the policy server may become a single point of failure. But proper network planning and incorporating Rservpool architecture for policy server can strengthen the availability and reliability of the policy server.

Figure 1:
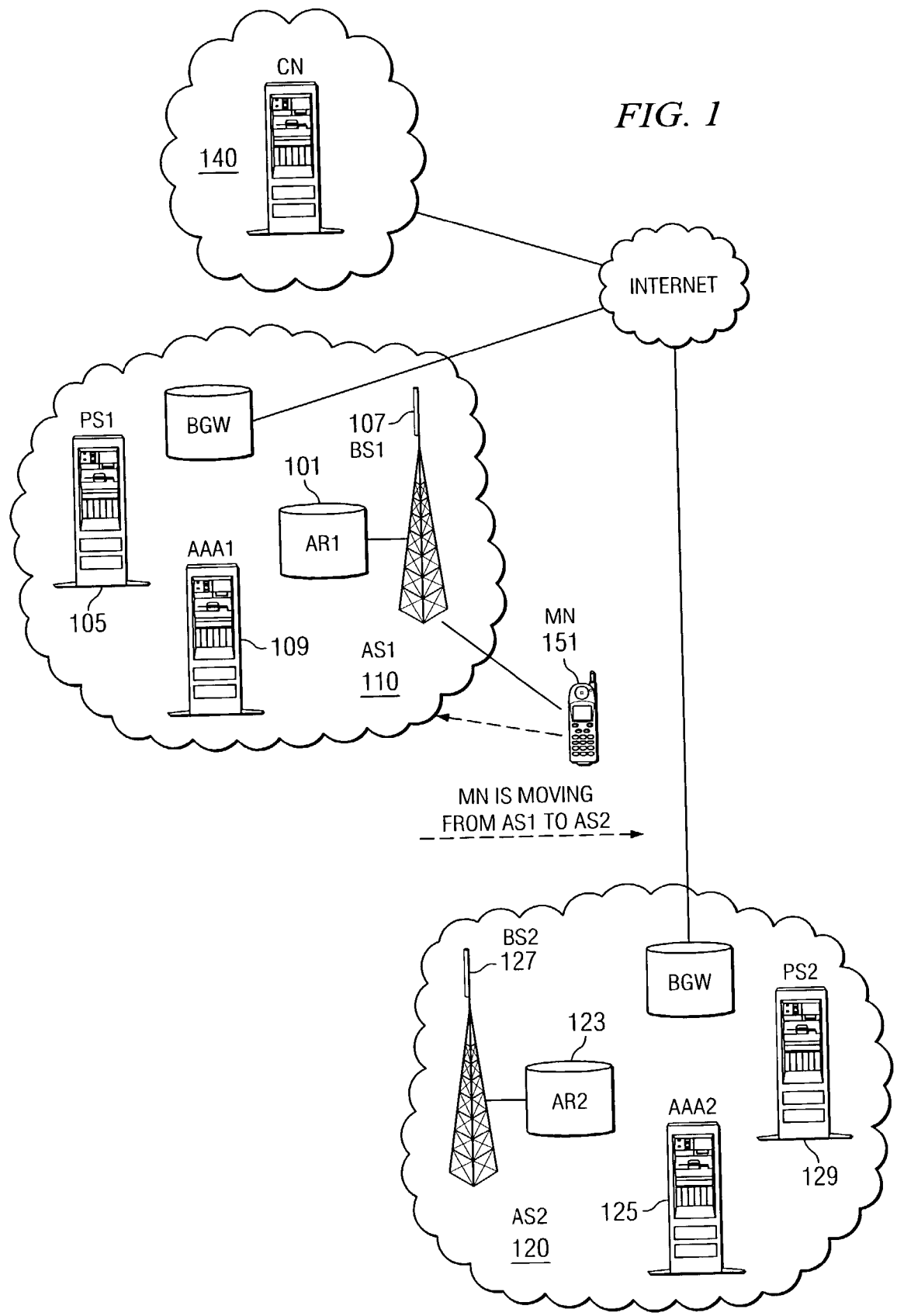
FIG. 1 is a reference system for transferring context of a mobile node between autonomous systems.

FIG. 1 shows the reference architecture for the context transfer framework and the target access router selection process. Access routers, e.g. source access router (AR) 101 and destination access router 123 are policy targets. On boot up, the access routers may report their capabilities (QoS, Security etc) to a policy server 105. The policy server (PS1) 105 then downloads the corresponding policy to the AR 101 according to the reported capabilities. Therefore the policy server 105 has all the information about an AR 101 capabilities in the administrative domain 110. In addition the policy server 105 can retrieve information relating to the base station 107 from the database of network management systems. The information includes, for example, which access router a base station 107 is connected to.

In FIG. 1, Mobile Node (MN) 151 is currently in Autonomous System AS1 110 and is communicating with a server in a core network 140. The static capabilities of the MN 151 are stored in a AAA server, e.g. AAA1 server 109. The policy server can retrieve this information from the AAA server of the MN home network. In the following, we describe the problem of inter domain handover which is more complicated than intra domain handovers.

For example, when the MN 151 is in the AS1 110, the static capabilities of the MN 115 are retrieved by PS1 105 from AAA1 server 109 and dynamic capabilities (or negotiated profiles) are kept with the access router AR1 107 that is currently serving the MN 151. When the MN 151 moves toward Autonomous System (AS2) 120, it receives identification information on a broadcast channel which may contain link layer information of a second base station (BS2) 127 or IP address of AR2 120 or Autonomous System number associating some link local address or any combination information. MN 151 forwards the information to AR1 101.

An embodiment includes steps. The first step is the access router selection process where policy servers compute a list of possible access routers that may serve the MN 151 and the MN 151 is informed of this list by the policy server in its own domain. The second step involves the actual context transfer. Details of the two steps are described in the following subsections.

7.1 Selection of Access Routers Prior to Handover

In this selection process, the policy server in the same domain as the candidate access routers computes the selection process.

When the MN receives new identifiers from more than one base station through the broadcast channel, the MN forwards the information to the AR currently serving it, e.g. AR1 101. The access router forwards it to the policy server, e.g. PS1 105. The minimal information which the policy server 105 expects is either the link layer identifier or Autonomous System (AS) number and link layer identifier.

1. If PS1 105 receives only link layer identifier, it checks first with the policy database to see whether that is simply an intra domain handover. If it is not an intra domain handover, PS1 105 checks with the neighboring AS defined in the policy database and forwards to their neighboring policy server.

2. (or) It would be faster if the AS number is also sent in the broadcast channel by each base station this eliminates lots of processing. If AS number is sent then the policy server, e.g. AR1 101, forwards the information to the respective policy server, e.g. PS2 126, along with the MN static capabilities (which it retrieved from AAA1 server 109).

3. After receiving the information, the PS2 125 determines whether AS2 120 can potentially serve the MN 151. If yes, PS2 125 further computes the candidate access routers that will be able to serve the MN 151. PS2 129 then returns the computed access routers to PS1 105 (this is totally dependent on the topology of the AS). An algorithm for selecting the access routers is described in the next subsection. If the access router cannot serve the MN, PS2 125 simply sends a negative acknowledgement to PS1 105.

If MN 151 has forwarded more than one access system identifiers to the AR1 101, the PS1 105 performs the above steps for each access system. Finally PS1 105 sends a message to MN 151 informing all the possible (or authorized) ARs that may server the MN 151.

7.1.1 An Algorithm for AR Selection Within an AS

An embodiment of an AR selection algorithm may be used by a policy server. It is based on a sequence of elimination processes.

Given the set of reachable access routers for the mobile node

1. Eliminate those routers that cannot meet the mobile node's static capabilities.
2. Eliminate those routers whose traffic load is above a given threshold;
3. Use other operator defined rules to eliminate more routers.
4. Finally, when all rules are executed and if several routers survived the elimination processes forward all of them to the initiating PS.

The order of the rules may be changed on the policy server. In general, a rule that is able to eliminate more routers should be evaluated before those that eliminate fewer routers. Some times it may be difficult to predict which rule will eliminate more routers. The insight can be gained with experience and a careful analysis of log data on policy servers.

There is no need to reserve any resource at AR's during this process. PS can pre-authorize MN. The initiating PS after receiving the list of possible AR's has to periodically inform the MN's presence in their network.

The second step in the above selection algorithm requires the policy server to have the knowledge of traffic load on the access routers. There are two possible ways a policy server may obtain the current load of access routers:

If the policy server also performs admission controls, it knows the load on those routers naturally. If there is an admission control server, for example a bandwidth broker, the policy server can do a simple query of the server to get the load situation on those routers.

Some networks may have no centralized admission control. For example, a network may operate on constrained routing where unused network resources are advertised globally within an administrative domain and each router makes admission control decision based on the advertised information. In this case, the policy server simply listens to the advertisement to know the unused resources on those routers. It then uses that information as an input to the above router selection algorithm.

7.2 Context Transfer Protocol

When a MN is roaming in a network, it may receive signals from adjacent base stations. The MN can perform two types of handovers namely reactive and proactive. In the reactive case, the MN informs the new access router to pickup its context from the old access router. In the proactive case, the MN forwards the new access router's identities to the old access router and informs the old access router to push the context to the new access router.

Preconditions

1. MN is initially in AS2 and is moving towards AS1. MN picks up more than one base station signals. With the target access router selection process described above, the MN is aware of the possible access routers who can satisfy its capabilities.

Figure 2:
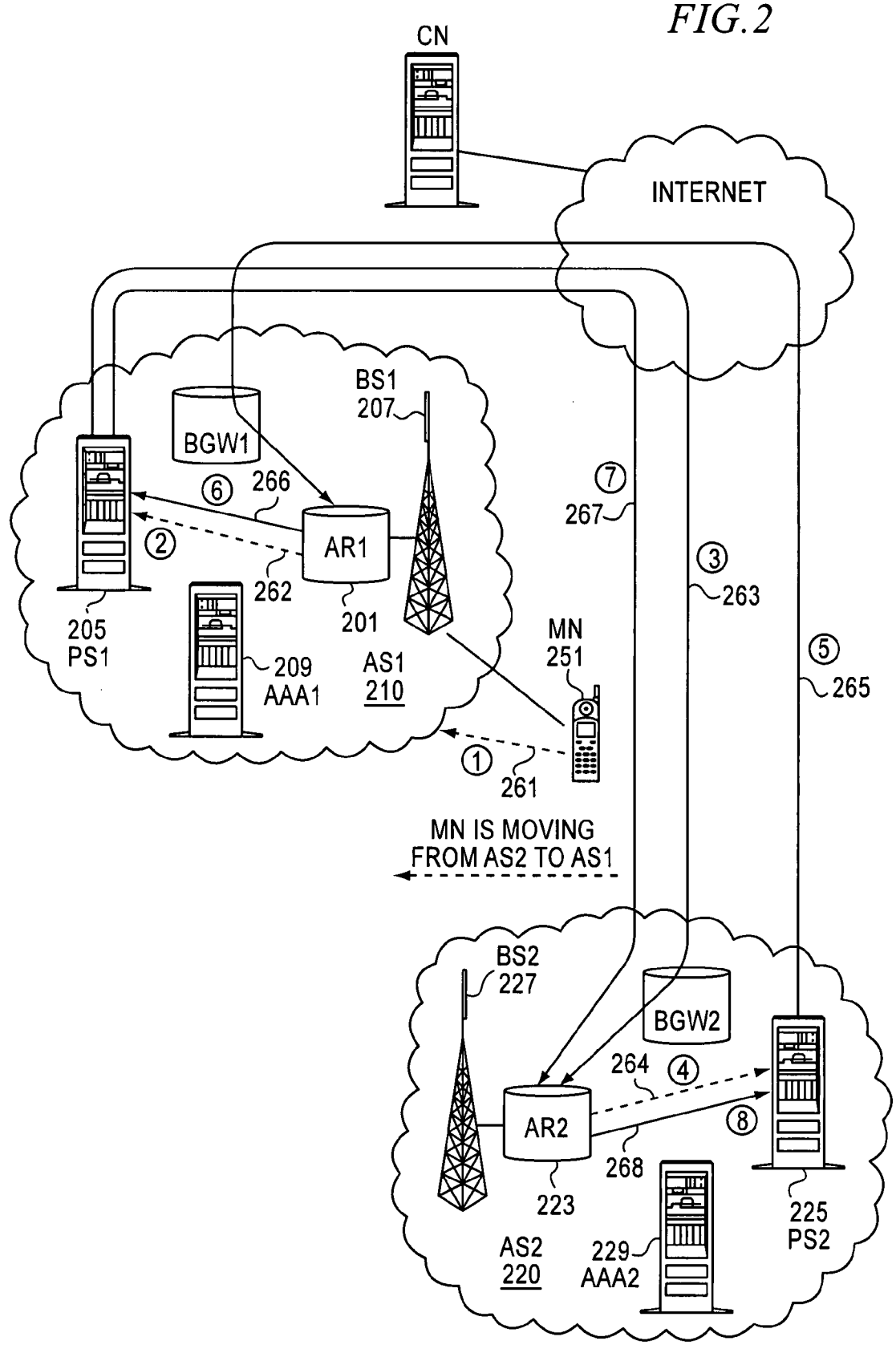
FIG. 2 shows a context transfer message flow, according to an embodiment.

2. During the target access router selection process, each possible AS domain has pre-authorized the MN. Hence, context transfer is just a simple relocation of state information FIG. 2 shows a context transfer message flow.

1. MN 251 that was roaming in the AS2 220 moves towards AS1 210 and starts receiving the base station signal. MN 251 forwards the AS2:AR2 identity to the AR1, as a identity packet 261.

2. AR1 201 requests 262 PS1 205 to prepare the context transfer request.

3. PS1 205 forwards the MN context request to the AS2 220 in a forwarded packet 263.

4. AR2 223 sends the context related to the MN in a message 264 to PS2 225.

5. PS2 225 adds to the context received from AS2 the static context about MN that is available at PS2 225. In addition, PS2 225 may collect other dynamic context from other network elements. For example, MN 251 may have a security context associated with a gateway in AS2 220. PS2 225 sends all these static and dynamic contexts to AR1 201 in a first cross-network message 265.

6. AR1 201 extracts the context relevant to AR1 201 and forwards the rest of the context 266 to PS1.

7. PS1 205 extracts the static context and forwards the rest of the context 167 to related network elements, e.g., a security gateway that will reconstruct the security context. PS1 205 sends a context transfer complete message to AR2 223 in a second cross-network message 267.

8. AR2 223 forwards the context transfer complete message 268 to PS2 225 and finally context may be removed from AS2 223.

The policy server may be totally kept in private address space due to security reasons and may not be accessible or visible from outside the autonomous system.

Figure 3:
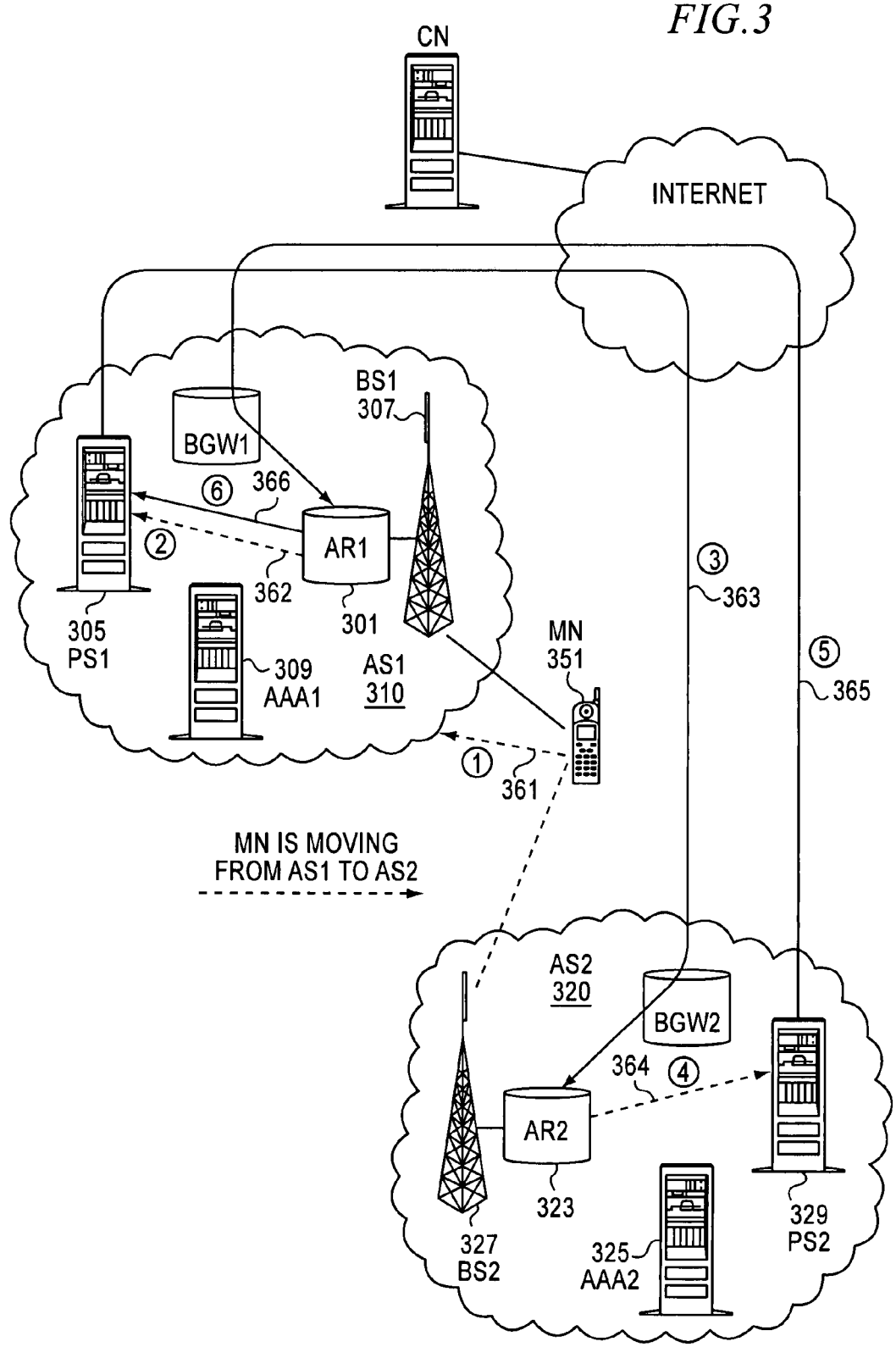
FIG. 3 shows a proactive handover embodiment.

FIG. 3 shows a proactive handover embodiment.

Preconditions:

1. MN 351 is initially in the AS1 310 and is moving towards AS2 320. MN 351 picks up more than one base station signals. With the target access router selection process described above, the MN 351 is aware of the possible access routers who can satisfy its capabilities.

2. During the target access router selection process, each possible AS domain has pre-authorized the MN 351. Hence, context transfer is just a simple relocation of state information.

Context Transfer Message Flow:

1. MN 351 that is currently roaming in AS1 310 decides to move to AS2 320 because the signal from AS2 320 is stronger than that from AS1 310. Under this situation MN 351 forwards 361 the AS2:AR2 identity to the AR1 301 and requests it to start the context transfer.

2. AR1 301 forwards the context to PS1 305 and informs PS1 305 to forward 362 the context to AR2 323.

3. PS1 305 adds to the context received from AR1 301 the static context about MN 351 that is available at PS1 305. In addition, PS1 305 may collect other dynamic context from other network elements. For example, MN 351 may have a security context associated with a gateway. PS1 305 sends 363 all these static and dynamic contexts to AR2 323.

4. AR2 323 extracts the context relevant to AR2 323 and forwards 364 the rest of the context to PS2 329.

5. PS2 329 extracts the static context and forwards the rest of the context to related network elements, e.g., a security gateway that will reconstruct the security context. PS2 329 sends 365 a context transfer complete message to AR1 301.

6. AR1 301 forwards 366 the context transfer complete message to PS1 305 and finally context is removed from AS1 310.

Although described in the context of particular embodiments, it will be apparent to those skilled in the art that a number of modifications and various changes to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

What is claimed is:

1. A method comprising:
   receiving a first rest of context from a first access router, said first rest of context having a static context and a second rest of context;
   extracting the static context from the first rest of context;
   forwarding a second rest of context to at least one network element; and
   sending a context transfer complete message to a second access router.

2. The method of claim 1 wherein the first access router is a component of a first autonomous system and the second access router is a component of a second autonomous system.

3. The method of claim 2 wherein the receiving a first rest of context is preceded by:
   receiving a context transfer request from the first autonomous system; and
   forwarding the context transfer request to the second autonomous system.

4. The method of claim 3 wherein the forwarding the context transfer request is followed by:
   adding a first context with a second context to form complete contexts.

5. The method of claim 4 wherein the adding is followed by:
   sending the complete contexts from a first policy server to the second access router.

6. The method of claim 5 wherein the sending the complete contexts is followed by:
   extracting a relevant context from the complete contexts.

7. The method of claim 1 wherein the at least one network element comprises a security gateway.

8. The method of claim 1 further comprising:
   forwarding the context transfer complete message to the first policy server.

9. The method of claim 8 wherein the receiving a first rest of context is preceded by:
   receiving a context transfer request from the first autonomous system; and
   forwarding the context transfer request to the second autonomous system.

10. An apparatus comprising:
    a receiver configured to receive a first rest of context from a first access router, said rest of context having a static context and a second rest of context;
    an extractor configured to extract the static context from the first rest of context;
    a forwarder configured to forward a second rest of context to at least one network element; and
    a transmitter configured to send a context transfer complete message to a second access router.

11. The apparatus of claim 10, wherein the first access router is a component of a first autonomous system and the access router is a component of a second autonomous system.

12. The apparatus of claim 10, wherein the at least one network element comprises a security gateway.

13. An apparatus comprising:
receiving means for receiving a first rest of context from a first access router, said rest of context having a static context and a second rest of context;

extracting means for extracting the static context from the first rest of context;

forwarding means for forwarding a second rest of context to at least one network element; and transmitting means for sending a context transfer complete message to a second access router.

* * * * *